US012044254B2

(12) United States Patent
Wente et al.

(10) Patent No.: US 12,044,254 B2
(45) **Date of Patent: *Jul. 23, 2024**

(54) REFUSE VEHICLE CONTROL SYSTEMS AND METHODS

(71) Applicant: Oshkosh Corporation, Oshkosh, WI (US)

(72) Inventors: Derek Wente, Oshkosh, WI (US); Logan Gary, Oshkosh, WI (US); Jerrod Kappers, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,902

(22) Filed: May 2, 2023

(65) Prior Publication Data

US 2023/0265866 A1 Aug. 24, 2023

Related U.S. Application Data

(63) Continuation of application No. 17/232,244, filed on Apr. 16, 2021, now Pat. No. 11,674,534.

(60) Provisional application No. 63/011,631, filed on Apr. 17, 2020.

(51) Int. Cl.

| | |
|---|---|
| ***F15B 11/16*** | (2006.01) |
| ***B65F 3/04*** | (2006.01) |

(52) U.S. Cl.

CPC .............. *F15B 11/161* (2013.01); *B65F 3/04* (2013.01); *F15B 2211/205* (2013.01); *F15B 2211/20553* (2013.01); *F15B 2211/6652* (2013.01)

(58) Field of Classification Search

CPC ............ F15B 11/161; F15B 2211/6652; F15B 2211/20553; B65F 3/04

See application file for complete search history.

(56) References Cited

U.S. PATENT DOCUMENTS

| | | | | | |
|---|---|---|---|---|---|
| 4,199,942 | A * | 4/1980 | Kasper | E02F 9/2232 60/420 |
| 4,823,552 | A * | 4/1989 | Ezell | F04B 49/065 60/449 |
| 5,077,975 | A * | 1/1992 | Kauss | F04B 1/324 60/449 |

(Continued)

FOREIGN PATENT DOCUMENTS

| | | | | |
|---|---|---|---|---|
| CN | 110431274 A * | 11/2019 | | E02F 9/22 |

*Primary Examiner* — Thomas E Lazo

(74) *Attorney, Agent, or Firm* — Foley & Lardner LLP

(57) ABSTRACT

A refuse vehicle includes a chassis and a vehicle body. A variable displacement pump is positioned within the vehicle body and is configured to pump hydraulic fluid from a hydraulic fluid reservoir into a high pressure line of a hydraulic circuit. A lifting system on the vehicle includes at least one actuator in fluid communication with the variable displacement pump, which delivers pressurized hydraulic fluid from the hydraulic fluid reservoir to the actuator through the high pressure line to adjust a position of the actuator. A valve is positioned downstream of the variable displacement pump. In a first valve position, the valve restricts flow outward from the high pressure line. In a second valve position, the valve directs fluid from the high pressure line into a lower pressure line to reduce a hydraulic pressure within the high pressure line and adjust an output parameter of the variable displacement pump.

20 Claims, 5 Drawing Sheets

(56) References Cited

U.S. PATENT DOCUMENTS 5,833,428 A * 11/1998 Szinte .................... B65F 3/041 414/408
5,919,027 A 7/1999 Christenson
5,934,858 A 8/1999 Christenson
5,934,867 A 8/1999 Christenson
5,938,394 A 8/1999 Christenson
5,951,235 A 9/1999 Young et al.
5,967,731 A 10/1999 Brandt
5,971,694 A 10/1999 McNeilus et al.
5,984,609 A 11/1999 Bartlett
5,993,168 A * 11/1999 Erkkilae ................ F04B 49/08 417/213
6,033,176 A 3/2000 Bartlett
6,062,803 A 5/2000 Christenson
6,089,813 A 7/2000 McNeilus et al.
6,120,235 A 9/2000 Humphries et al.
6,123,500 A 9/2000 McNeilus et al.
6,210,094 B1 4/2001 McNeilus et al.
6,213,706 B1 4/2001 Christenson
6,224,318 B1 5/2001 McNeilus et al.
6,315,515 B1 11/2001 Young et al.
6,336,783 B1 1/2002 Young et al.
6,350,098 B1 2/2002 Christenson et al.
6,390,758 B1 5/2002 Mcneilus et al.
6,447,239 B2 9/2002 Young et al.
6,474,928 B1 11/2002 Christenson
6,565,305 B2 5/2003 Schrafel
7,070,382 B2 7/2006 Pruteanu et al.
7,284,943 B2 10/2007 Pruteanu et al.
7,556,468 B2 7/2009 Grata
7,559,735 B2 7/2009 Pruteanu et al.
7,878,750 B2 2/2011 Zhou et al.
8,182,194 B2 5/2012 Pruteanu et al.
8,215,892 B2 7/2012 Calliari
8,360,706 B2 1/2013 Addleman et al.
8,435,010 B2 * 5/2013 Dybing .................... F15B 9/04 92/13
8,540,475 B2 9/2013 Kuriakose et al.
8,807,613 B2 8/2014 Howell et al.
9,181,684 B2 * 11/2015 Okano ................. E02F 9/2285
9,216,856 B2 12/2015 Howell et al.
9,347,200 B2 * 5/2016 Hennemann .......... E02F 9/2282
9,387,985 B2 7/2016 Gillmore et al.
9,880,581 B2 1/2018 Kuriakose et al.
9,981,803 B2 5/2018 Davis et al.
10,196,205 B2 2/2019 Betz et al.
10,457,533 B2 10/2019 Puszkiewicz et al.
10,558,234 B2 2/2020 Kuriakose et al.
10,781,090 B2 9/2020 Puszkiewicz et al.
10,800,605 B2 10/2020 Rocholl et al.
10,858,184 B2 12/2020 Betz et al.
10,859,167 B2 12/2020 Jax et al.
10,899,538 B2 1/2021 Nelson et al.
11,001,135 B2 5/2021 Yakes et al.
11,001,440 B2 5/2021 Rocholl et al.
11,007,863 B2 5/2021 Yakes et al.
11,674,534 B2 * 6/2023 Wente ...................... B65F 3/04 414/406
2019/0325220 A1 * 10/2019 Wildgrube ............ G06V 20/20
2020/0262328 A1 8/2020 Nelson et al.
2020/0346547 A1 11/2020 Rocholl et al.
2020/0346556 A1 11/2020 Rocholl et al.
2020/0346557 A1 11/2020 Rocholl et al.
2020/0346854 A1 11/2020 Rocholl et al.
2020/0346855 A1 11/2020 Rocholl et al.
2020/0346856 A1 11/2020 Rocholl et al.
2020/0346857 A1 11/2020 Rocholl et al.
2020/0346858 A1 11/2020 Buege et al.
2020/0346859 A1 11/2020 Buege et al.
2020/0346860 A1 11/2020 Buege et al.
2020/0346861 A1 11/2020 Rocholl et al.
2020/0346862 A1 * 11/2020 Rocholl ................. B65F 3/201
2020/0347659 A1 11/2020 Rocholl et al.
2020/0347661 A1 11/2020 Rocholl et al.
2020/0347857 A1 11/2020 Clifton et al.
2020/0398670 A1 12/2020 Rocholl et al.
2020/0398695 A1 12/2020 Rocholl et al.
2020/0398697 A1 12/2020 Rocholl et al.
2021/0002112 A1 1/2021 Puszkiewicz et al.
2021/0054942 A1 2/2021 Jax et al.
2021/0086991 A1 3/2021 Betz et al.
2021/0139237 A1 5/2021 Nelson et al.

* cited by examiner

REFUSE VEHICLE CONTROL SYSTEMS AND METHODS

CROSS-REFERENCE TO RELATED APPLICATION

This application claims priority to U.S. patent application Ser. No. 17/232,244, filed Apr. 16, 2021, which claims the benefit of and priority to U.S. Provisional Patent Application No. 63/011,631, filed Apr. 17, 2020, the contents of which are hereby incorporated by reference in their entirety.

BACKGROUND

Refuse vehicles collect a wide variety of waste, trash, and other material from residences and businesses. Refuse vehicles generally include a lifting system that is movable to engage and lift a waste receptacle so that the waste receptacle's contents can be transferred into a receptacle onboard the refuse vehicle. The lifting system includes an arm assembly that is movable to engage and lift the waste receptacle using one or more hydraulic cylinders that extend or retract to adjust the position of the lifting system relative to the refuse vehicle. The hydraulic cylinders on the refuse vehicle are supplied with pressurized hydraulic fluid from a hydraulic pump positioned onboard the refuse vehicle.

SUMMARY

One exemplary embodiment relates to a refuse vehicle. The refuse vehicle includes a chassis and a vehicle body. The chassis supports both wheels and the vehicle body. The vehicle body defines a receptacle for storing refuse. A variable displacement pump is positioned within or adjacent the vehicle body and is configured to pump hydraulic fluid from a hydraulic fluid reservoir into a high pressure line of a hydraulic circuit on the refuse vehicle. A lifting system is coupled to (e.g., directly or indirectly) the vehicle body and is movable relative to the receptacle to invert refuse containers to remove the contents stored therein and transfer the contents to the receptacle. The lifting system includes at least one actuator in fluid communication with the variable displacement pump. The variable displacement pump delivers pressurized hydraulic fluid from the hydraulic fluid reservoir to the actuator through the high pressure line to adjust a position of the actuator. A valve is positioned within the hydraulic circuit downstream of the variable displacement pump, and is movable between at least two positions. In a first position, the valve restricts flow outward from the high pressure line. In the second position, the valve directs fluid from the high pressure line through the valve and into a lower pressure line within the hydraulic circuit that reduces the hydraulic pressure within the high pressure line and adjusts an output parameter of the variable displacement pump (e.g., torque, displacement, RPM, etc.).

Another exemplary embodiment relates to a refuse vehicle. The refuse vehicle includes a chassis and a vehicle body. The chassis supports both wheels and the vehicle body. The vehicle body defines a receptacle for storing refuse. A variable displacement pump is positioned within or adjacent the vehicle body and is configured to pump hydraulic fluid from a hydraulic fluid reservoir into a high pressure line of a hydraulic circuit on the refuse vehicle toward actuators positioned about the vehicle body. The actuators include at least a lifting actuator and a compacting actuator. Delivering hydraulic fluid from the hydraulic fluid reservoir to the actuators through the high pressure line adjusts a position of at least one of the actuators. A valve is positioned downstream of the variable displacement pump and is configured to selectively control hydraulic fluid flow between the variable displacement pump and the actuators. In a first position, the valve restricts flow between the high pressure line and a lower pressure control line. In a second position, the valve directs hydraulic fluid from the high pressure line into the control line to reduce a hydraulic pressure within the high pressure line and to adjust an output parameter of the variable displacement pump (e.g., torque, displacement, RPM, etc.)

Another exemplary embodiment relates to a refuse vehicle. The refuse vehicle includes a chassis and a vehicle body. The chassis supports wheels and the vehicle body. The vehicle body defines a receptacle for storing refuse. The vehicle includes a variable displacement pump. The variable displacement pump is positioned on, within, or adjacent the vehicle body and is configured to pump hydraulic fluid from a hydraulic fluid reservoir into a high pressure line of a hydraulic circuit toward actuators that are positioned about the vehicle. Delivering hydraulic fluid from the hydraulic fluid reservoir to the actuators through the high pressure line adjusts a position of at least one of the actuators. A torque limiting valve is positioned downstream of the variable displacement pump and is configured to move between a first open position, a blocking position, and a second open position in response to hydraulic pressure within the high pressure line. When the torque limiting valve is in the first open position, the torque limiting valve restricts flow between the high pressure line and a lower pressure control line. When the torque limiting valve is in the second open position, the torque limiting valve directs hydraulic fluid from the high pressure line into the control line toward the variable displacement pump to adjust an output parameter of the variable displacement pump. Fluid pressure within the high pressure line moves the torque limiting valve between the first open position, the blocking position, and the second open position. Fluid pressure within the control line adjusts a displacement of the variable displacement pump.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the FIGURES generally, the various exemplary embodiments disclosed herein relate to systems, apparatuses, and methods for controlling a refuse vehicle. Specifically, the disclosure provides systems and methods for monitoring and controlling a swashplate variable displacement pump to avoid over-torqueing or stalling the pump motor when pump output demand is increased. The control systems include a sensor that monitors the pressure of hydraulic fluid leaving the hydraulic pump and another sensor that monitors the position of the swashplate of the hydraulic fluid flow to determine the pump output. A spool valve is positioned within the hydraulic circuit and controls fluid flow between a high pressure line at the outlet of the swashplate variable displacement pump and a hydraulic fluid reservoir. The spool valve is biased into a first open position blocking fluid flow between the high pressure line and the hydraulic fluid reservoir. If the pressure of the hydraulic fluid downstream of the swashplate variable displacement pump exceeds a threshold pressure, the bias on the spool valve is overcome and the spool valve translates to a second open position. In the second open position, hydraulic fluid within the high pressure line is directed through the spool valve and into an intermediate pressure line. The intermediate pressure line directs hydraulic fluid toward the variable displacement pump to urge the swashplate of the swashplate variable displacement pump toward a flow reducing position (e.g., vertical) to decrease pump output and, as a result, decrease the torque experienced by the motor of the swashplate variable displacement pump. The spool valve remains in the second position until the pressure within the high pressure line returns to a level below the threshold pressure, where the bias can overcome hydraulic forces to return the spool valve to the first position. The spool valve serves as a torque limiting bypass valve that can prevent a motor of the hydraulic pump from stalling when power consumption is raised.

Figure 1:
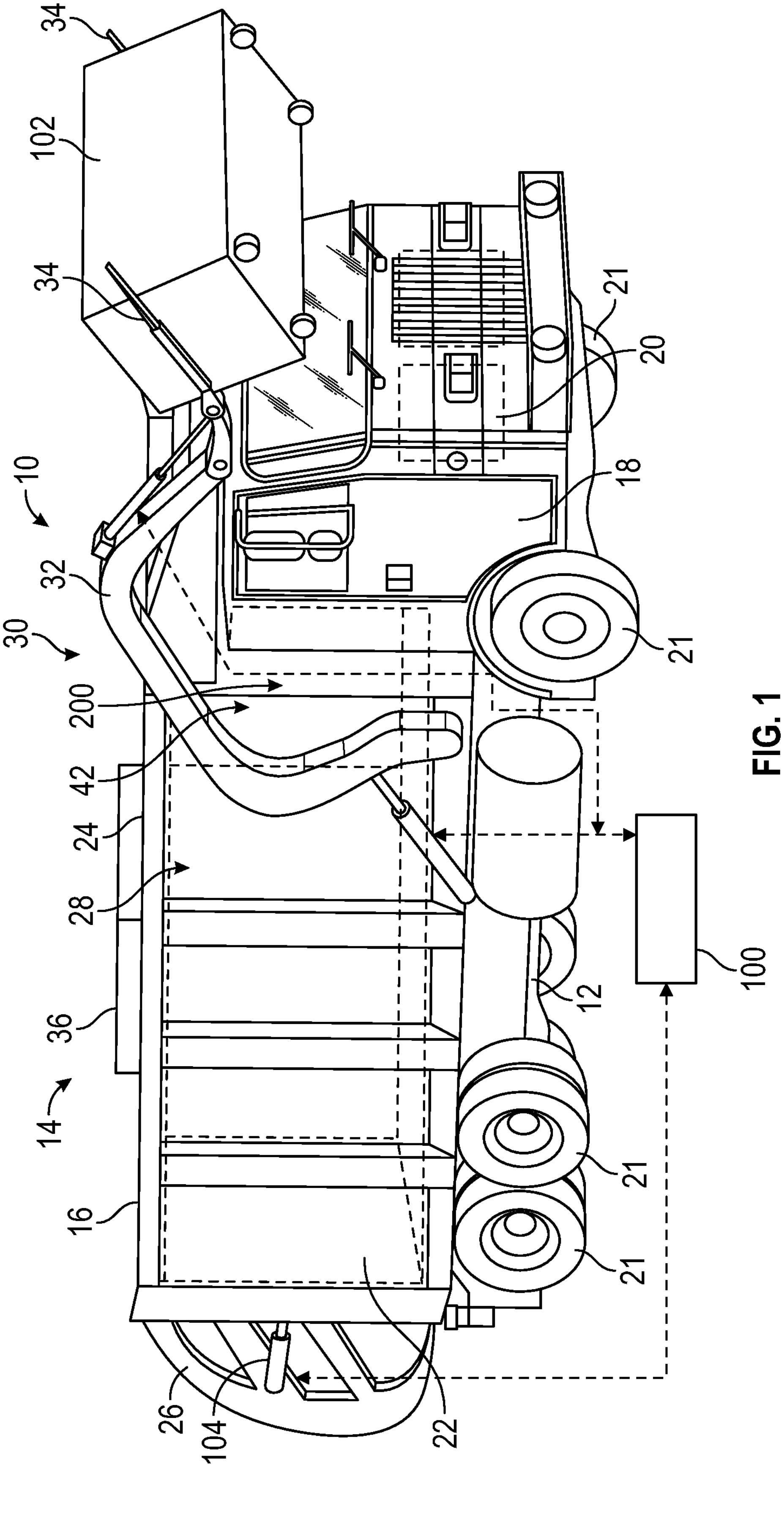
FIG. 1 is a perspective view of a front loading refuse vehicle according to an exemplary embodiment.
Figure 2:
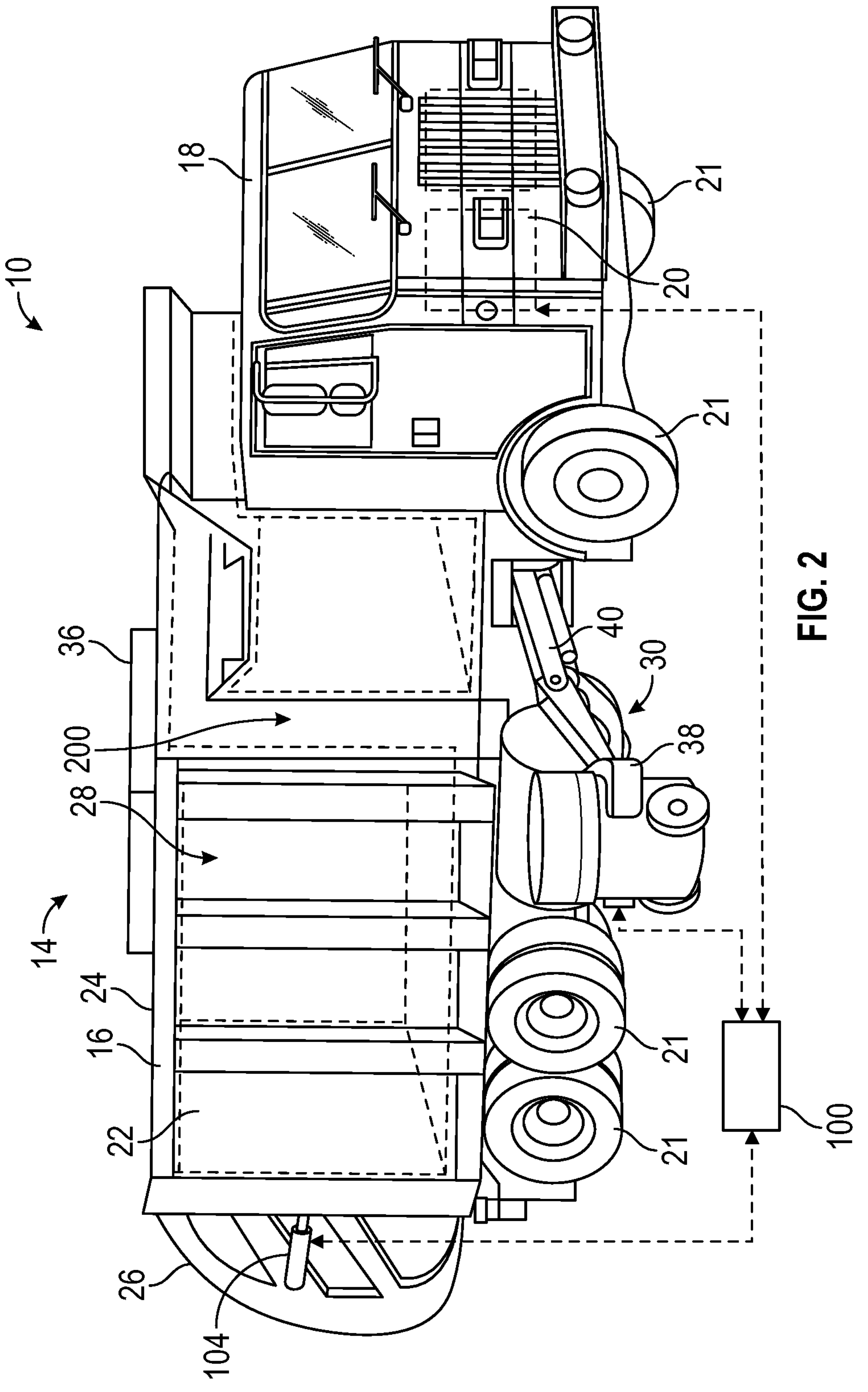
FIG. 2 is a perspective view of a side loading refuse vehicle according to an exemplary embodiment.

Referring to FIGS. 1-2, a vehicle, shown as refuse truck 10 (e.g., garbage truck, waste collection truck, sanitation truck, etc.), includes a chassis, shown as a frame 12, and a body assembly, shown as body 14, coupled to the frame 12. The body assembly 14 defines an on-board receptacle 16 and a cab 18. The cab 18 is coupled to a front end of the frame 12, and includes various components to facilitate operation of the refuse truck 10 by an operator (e.g., a seat, a steering wheel, hydraulic controls, etc.) as well as components that can execute commands automatically to control different subsystems within the vehicle (e.g., computers, controllers, processing units, etc.). The refuse truck 10 further includes a prime mover 20 (e.g., an internal combustion engine, electric motor, hybrid drive, etc.) coupled to the frame 12 at a position beneath the cab 18. The prime mover 20 provides power to a plurality of motive members, shown as wheels 21, and to other systems of the vehicle (e.g., a pneumatic system, a hydraulic system, etc.). The prime mover 20 may be configured to use a variety of fuels (e.g., gasoline, diesel, bio-diesel, ethanol, natural gas, etc.), according to various exemplary embodiments. According to an alternative embodiment, the prime mover 20 is one or more electric motors coupled to the frame 12. The electric motors may consume electrical power from an on-board energy storage device (e.g., batteries, ultra-capacitors, etc.), from an on-board generator (e.g., an internal combustion engine), or from an external power source (e.g., overhead power lines) and provide power to the systems of the refuse truck 10.

According to an exemplary embodiment, the refuse truck 10 is configured to transport refuse from various waste receptacles within a municipality to a storage or processing facility (e.g., a landfill, an incineration facility, a recycling facility, etc.). As shown in FIGS. 1-2, the body 14 and on-board receptacle 16, in particular, include a series of panels, shown as panels 22, a cover 24, and a tailgate 26. The panels 22, cover 24, and tailgate 26 define a collection chamber 28 of the on-board receptacle 16. Loose refuse is placed into the collection chamber 28, where it may be thereafter compacted. The collection chamber 28 provides temporary storage for refuse during transport to a waste disposal site or a recycling facility, for example. In some embodiments, at least a portion of the on-board receptacle 16 and collection chamber 28 extend over or in front of the cab 18. According to the embodiment shown in FIGS. 1-2, the on-board receptacle 16 and collection chamber 28 are each positioned behind the cab 18. In some embodiments, the collection chamber 28 includes a hopper volume and a storage volume. Refuse is initially loaded into the hopper volume and thereafter compacted into the storage volume. According to an exemplary embodiment, the hopper volume is positioned between the storage volume and the cab 18 (i.e., refuse is loaded into a position behind the cab 18 and stored in a position further toward the rear of the refuse truck 10).

Referring again to the exemplary embodiment shown in FIG. 1, the refuse truck 10 is a front-loading refuse vehicle. As shown in FIG. 1, the refuse truck 10 includes a lifting system 30 that includes a pair of arms 32 coupled to the frame 12 on either side of the cab 18. The arms 32 may be rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container (e.g., protrude through apertures within the refuse container, etc.). During operation of the refuse truck 10, the forks 34 are positioned to engage refuse containers. For example, the refuse truck 10 is driven into position until the forks 34 protrude through the apertures within the refuse container). As shown in FIG. 1, the arms 32 are rotated to lift the refuse container over the cab 18. A second actuator (e.g., a hydraulic cylinder) articulates the forks 34 to tip the refuse out of the container and into the hopper volume of the collection chamber 28 through an opening in the cover 24. The actuator thereafter rotates the arms 32 to return the empty refuse container 102 to the ground. According to an exemplary embodiment, a top door 36 is slid along the cover 24 to seal the opening thereby preventing refuse from escaping the collection chamber 28 (e.g., due to wind, etc.).

Referring to the exemplary embodiment shown in FIG. 2, the refuse truck 10 is a side-loading refuse vehicle that includes a lifting system, shown as a grabber 38 that is configured to interface with (e.g., engage, wrap around, etc.) a refuse container (e.g., a residential garbage can, etc.). According to the exemplary embodiment shown in FIG. 2, the grabber 38 is movably coupled to the body 14 with an arm 40. The arm 40 includes a first end coupled to the body 14 and a second end coupled to the grabber 38. An actuator (e.g., a hydraulic cylinder) articulates the arm 40 and positions the grabber 38 to interface with the refuse container. The arm 40 may be movable within one or more directions (e.g., up and down, left and right, in and out, rotationally clockwise or counterclockwise, etc.) to facilitate positioning the grabber 38 to interface with the refuse container. According to an alternative embodiment, the grabber 38 is movably coupled to the body 14 with a track. After interfacing with the refuse container, the grabber 38 is lifted up the track (e.g., with a cable, with a hydraulic cylinder, with a rotational actuator, etc.). The track may include a curved portion at an upper portion of the body 14 so that the grabber 38 and the refuse container are tipped toward the hopper volume of the collection chamber 28. In either embodiment, the grabber 38 and the refuse container are tipped toward the hopper volume of the collection chamber 28 (e.g., with an actuator, etc.). As the grabber 38 is tipped, refuse falls through an opening in the cover 24 and into the hopper volume of the collection chamber 28. The arm 40 or the track then returns the empty refuse container to the ground, and the top door 36 may be slid along the cover 24 to seal the opening thereby preventing refuse from escaping the collection chamber 28 (e.g., due to wind).

Figure 3:
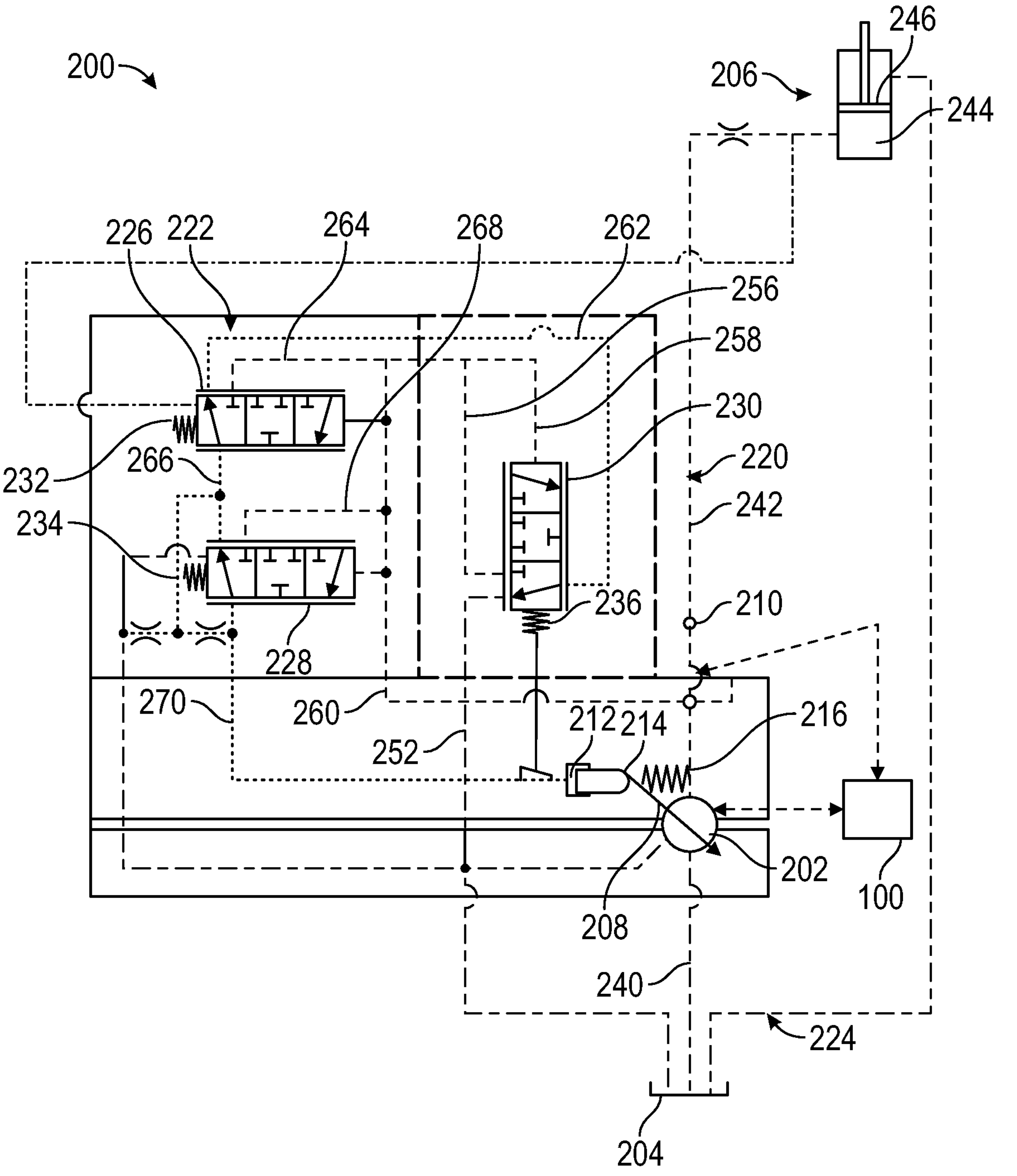
FIG. 3 is a schematic view of a hydraulic circuit that can be used to control either of the front loading refuse vehicle of FIG. 1 or the side loading refuse vehicle of FIG. 2.

With additional reference to FIG. 3, a hydraulic circuit 200 of the refuse truck 10 is depicted. The hydraulic circuit 200 generally includes a pump, shown as a swashplate variable displacement pump 202 that directs pressurized hydraulic fluid from a hydraulic fluid reservoir 204 (e.g., a tank) throughout various subsystems throughout the refuse truck 10. For example, the pump 202 is configured to provide pressurized hydraulic fluid from the hydraulic fluid reservoir 204 to the actuators (i.e., the hydraulic cylinders) within the lifting system 30 to manipulate a position or orientation of the arms 32 (or arm 38) and/or the forks 34, for example. The pump 202 can also supply pressurized hydraulic fluid from the hydraulic fluid reservoir 204 to a packer/compactor and ejector system 42 positioned within the onboard receptacle 16. In the schematic depicted in FIG. 3, the pump load 206 can represent any combination of one or more of the various actuators within the refuse truck 10.

The pump 202 is in communication with a processing unit, shown as processor 100. The processor 100 at least partially controls the pump 202 to deliver pressurized hydraulic fluid to accommodate variable pump loads 206 that may be requested during normal refuse truck 10 operation. The processor 100 receives signals from various inputs throughout the refuse truck 10 and can subsequently control different components within the hydraulic circuit 200 to execute different tasks. For example, the processor 100 may receive an input from one or more buttons or controls within the cab 18 of the refuse truck 10 that prompt the lifting system 30 to move in order to raise and empty the contents of a waste receptacle (e.g., waste receptacle 102, shown in FIG. 1) into the onboard receptacle 16 of the refuse truck 10. Upon receiving an input requesting an adjustment of the pump load 206 (e.g., requested movement of the lifting system 30), the processor 100 can activate or adjust an output of the pump 202 to deliver pressurized hydraulic fluid from the hydraulic fluid reservoir 204 to the one or more actuators forming the pump load 206 to carry out the requested operation.

A sensor 210 positioned within the hydraulic circuit 200 can monitor a pressure and/or a flow rate of hydraulic fluid downstream of the pump 202 to determine a current pump flow rate and/or the pressure of hydraulic fluid being output by the pump 202. Another sensor 212 coupled to the pump 202 can measure a current angle of a swashplate 208 on the pump 202, which corresponds to a current pump 202 displacement. In some examples, the processor 100 receives data from each of the sensors 210, 212 and, using the data received from the sensors 210, 212, determines an appropriate adjustment to the angle of the swashplate 208 to meet the new requested pump load 206 corresponding with the input received (e.g., to execute a compactor or ejection stroke or lift a waste receptacle with the lifting system 30) by the processor 100. The processor 100 then adjusts the swashplate 208 angle in order to arrive at the swashplate angle that was determined by the processor 100 so that the pump 202 can efficiently deliver the desired pump flow or fluid pressure associated with the requested pump load 206.

The hydraulic circuit 200 includes a series of valves and pressure lines that are configured to direct pressurized hydraulic fluid between the hydraulic fluid reservoir 204, the pump 202, and the load 206 to execute operations with the various actuators on the refuse truck 10. The valves and pressure lines are arranged so that the hydraulic circuit 200 is divided into a high pressure line 220, an intermediate pressure or "control" line 222, and a low pressure or "drain" line 224.

One or more valves 226, 228, 230 are positioned between the lines 220, 222, 224 and selectively provide fluid communication between the lines 220, 222, 224 to control operation of the pump 202 and distribute hydraulic fluid to the various actuators within the pump load 206. As depicted in FIG. 3, the valves 226, 228, 230 can each be spool valves that are movable between several positions that define different flow paths through the valves 226, 228, 230. In some examples, the valve 226 acts as a load sensing valve that monitors pressure drop within the hydraulic circuit 200 and operates to maintain a constant fluid flow rate through the valve 226. The valve 228 can act as a compensator valve that opens a pressure relief fluid pathway through the valve 228 when pressure within the hydraulic circuit 200 rises above a threshold level (e.g., a cutout pressure). The valve 230 can act as a torque limiting or torque reducing valve that adjusts a pump flow rate when a detected hydraulic pressure within the high pressure line 220 exceeds a threshold value.

During normal operation, and as depicted in FIG. 3, each of the valves 226, 228, 230 are biased into their first open positions. In the first open position, each of the valves 226, 228, 230 allow hydraulic fluid flow into and through the valves 226, 228, 230. The valves 226, 228, 230 can each be biased into the first position by biasing elements, shown as springs 232, 234, 236. The springs 232, 234, 236 provide a spring force (e.g., a biasing force) that opposes movement of the valves 226, 228, 230 away from their respective first open positions toward intermediate closed positions or to second open positions. As explained in additional detail below, the valves 226, 228, 230 can each be placed in fluid communication with the high pressure line 220. Fluid pressure within the high pressure line 220 can act against the springs 232, 234, 236 to move the valves 226, 228, 230 toward their respective intermediate closed or second open positions.

When the processor 100 initially receives or otherwise generates an input to adjust the pump load 206 (e.g., to provide pressurized hydraulic fluid to an actuator), the pump 202 begins to operate to deliver the requested pump load 206 from the hydraulic fluid reservoir 204. Hydraulic fluid is drawn from the hydraulic fluid reservoir 204 into the pump 202 along a first branch 240. The fluid is pressurized within the pump 202 and directed outward along a first branch 242 of the high pressure line 220. The pressurized hydraulic fluid is delivered through the first branch 242 to the pump load 206, which expands and extends the actuators so that the actuators can execute the various functions inputted and/or requested to the processor 100. As depicted in FIG. 3, hydraulic fluid inputted through the first branch 242 into the actuator reservoir 244 pushes a piston 246 of the pump load 206 outward and extends the one or more actuators within the pump load 206. As discussed above, the pump load 206 can be considered representative of the one or more different hydraulic actuators positioned upon the refuse truck 10.

As discussed above, the pump 202 is a swashplate-type variable displacement pump. The pump 202 includes a plurality of pistons that operate to compress fluid. The stroke length of the pistons, which is determined by the angle of the swashplate 208, determines the displacement (e.g., flow rate) of hydraulic fluid that exits the pump 202. Because the sensor 212 monitors the position (e.g., the angle) of the swashplate 208, the sensor 212 can effectively serve as a flow rate sensor. By communicating the monitored position of the swashplate 208 to the processor 100, the processor can then determine (e.g., calculate or access from a table of values) the flow rate (Q) out of the pump 202. The sensor 212 can be a mechanical position sensor (e.g., an encoder or an LVDT).

The sensor 210 can be used to monitor other characteristics of pump operation by monitoring the pressurized hydraulic fluid within the high pressure line 220. The sensor 210 is positioned along the first branch 242 of the high pressure line 220 to monitor one or more pump parameters. For example, the sensor 210 can monitor the hydraulic fluid pressure within the high pressure line 220. By being located just downstream of the pump 202, the sensor 210 provides a near real-time measurement of pump output. Using the measured hydraulic fluid pressure within the high pressure line 220 and the measured orientation of the swashplate 208 to determine the flow rate through the pump 202, the processor 100 can calculate the torque experienced by a motor of the pump 202. The torque (T) experienced by the motor of the pump 202 is the product of the pump pressure (P) and the flow rate (Q) through the pump 202 (i.e., T=P*Q).

The pump 202 is configured to provide pressurized hydraulic fluid from the hydraulic fluid reservoir 204 to multiple actuators that together define the pump load 206. In some instances, the pump load 206 may exceed the available pressure or flow rate that the pump 202 can produce. For example, if the lifting system 30 is attempting to raise a heavy waste receptacle while the compactor system 42 is executing a compactor stroke within the receptacle, further expansion of the hydraulic cylinders may be opposed. The resistance provided by the mass of the heavy waste receptacle 16 and the refuse within the receptacle's resistance to packing can oppose further movement of the hydraulic cylinders attempting to perform the lifting and compacting functions, respectively. Because the flow rate of the pump 202 does not change (e.g., the amount of hydraulic fluid necessary to move the piston 246 to a desired position within the actuator reservoir 244 remains constant), the resistance to movement causes a pressure spike within the first branch 242 of the high pressure line 220. With the flow rate (Q) remaining constant, the pressure spike (P) within the first branch 242 of the high pressure line 220 causes a subsequent spike in torque (T) experienced by the pump motor.

If the torque experienced by the pump motor approaches or exceeds the amount of torque that the pump motor can produce, the pump motor will slow or stall and potentially burn out. To avoid these potentially fatal motor conditions, the valve 230 is arranged to override the hydraulic circuit and mechanically control the pump 202 when the torque experienced by the motor exceeds a set threshold limit (e.g., 90% of maximum torque output). The valve 230 drops the torque experienced by the pump motor by mechanically adjusting the swashplate 208 position to reduce the piston stroke length of the pump 202. By lowering the displacement of the pump (Q), the torque experienced by the pump motor (T=P*Q) will also be reduced.

Figure 6:
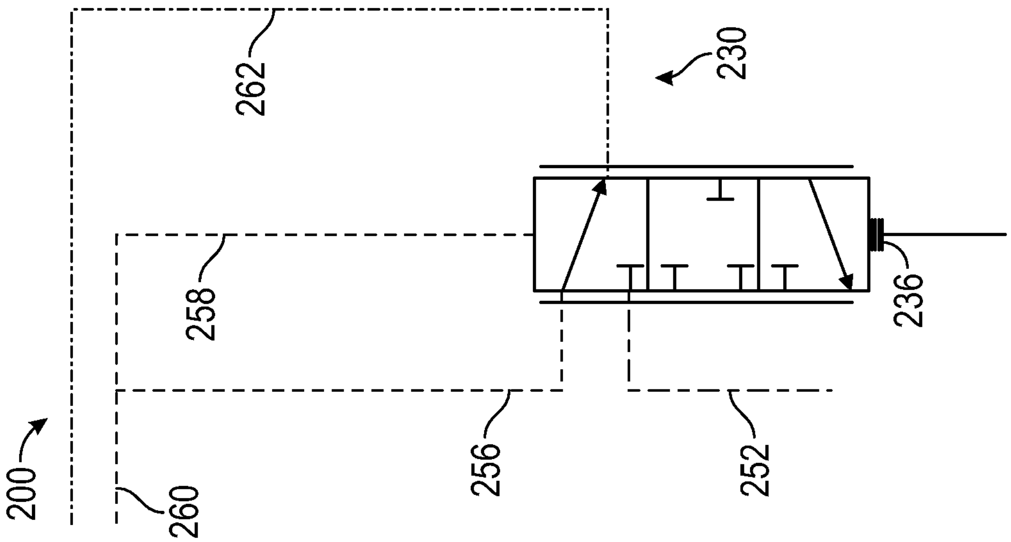
FIG. 6 is a detailed view of the spool valve of FIG. 4 shown in a second open position.
Figure 5:
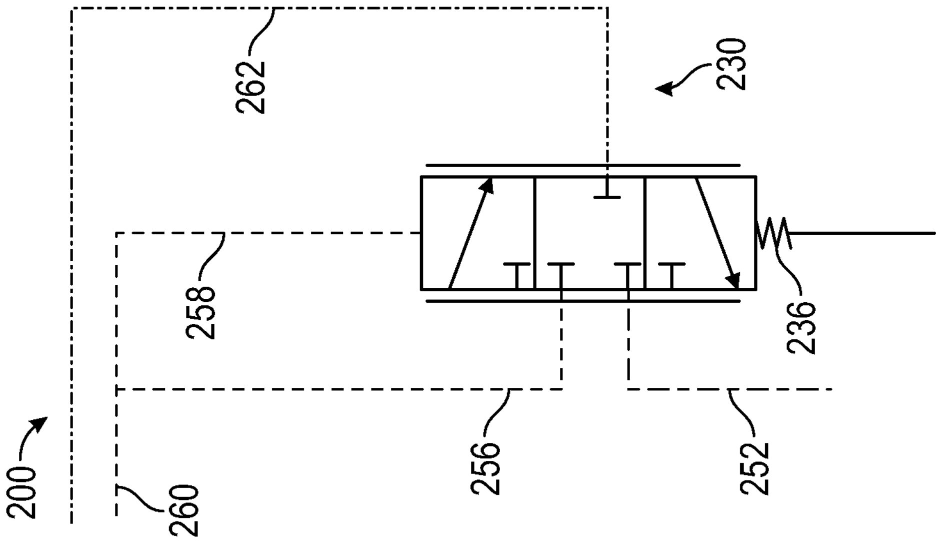
FIG. 5 is a detailed view of the spool valve of FIG. 4 shown in an intermediate closed position.
Figure 4:
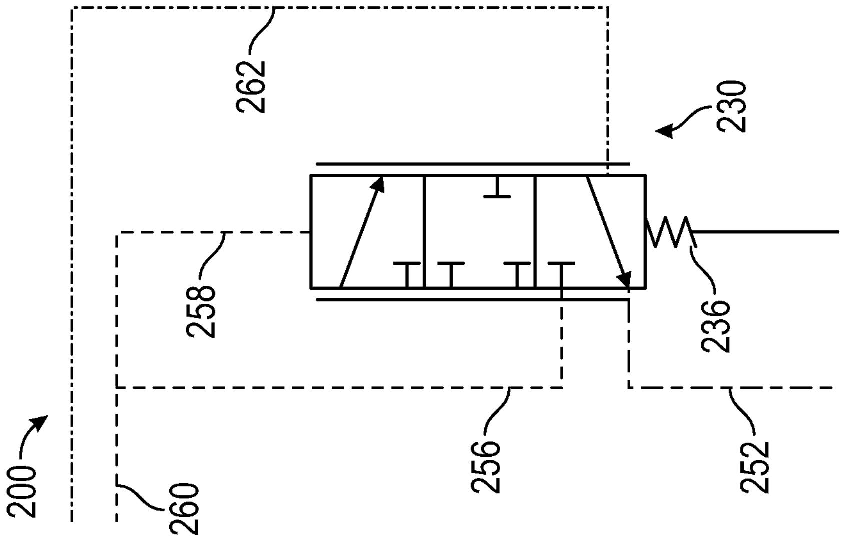
FIG. 4 is a detailed view of a spool valve present within the hydraulic circuit of FIG. 3 shown in a first open position, taken from the dashed box in FIG. 3 labeled "FIG. 4"

With continued reference to FIG. 3 and additional reference to FIGS. 4-6, the valve 230 and its operation are depicted. During normal operation conditions (e.g., T≤80% maximum torque output), the valve 230 is biased into its first open position. While the valve 230 is shown biased toward its first open position by the spring 236, various other types of mechanical and electromechanical biases can be used to hold the valve 230 in its first open position. For example, the valve 230 can be a solenoid valve that remains in the first open position whenever the sensor 210 detects that the hydraulic pressure within the first branch 242 of the high pressure line 220 is below a set threshold value. Alternatively, the valve 230 can be controlled by the processor 100 to stay in the first open position whenever the processor 100 calculates that the torque (T) experienced by the pump is within the range of torques associated with normal operating conditions (e.g., T≤80% maximum torque output).

In the first open position, the valve 230 is in communication with each of the high pressure line 220, the control line 222, and the drain line 224. The valve 230 provides a fluid flow path that allows flow from a first relief line 262 of the control line 222 through the valve 230 and into a first unloading branch 252 of the drain line 224, so that hydraulic fluid can be returned to the hydraulic fluid reservoir 204.

Simultaneously, the valve 230 is subjected to fluid pressure from the high pressure line 220. In the first open position, the valve 230 is in fluid communication with a first bypass line 256 and is subjected to hydraulic pressure from a first pressure line 258. Flow from the first bypass line 256 through the valve 230 is blocked when the valve 230 is in the first open position. Pressure and flow within the first pressure line 258 acts upon a spool of the valve 230, against the bias of the spring 236. During normal operating conditions (e.g., T≤80% maximum torque output), the hydraulic force within the first pressure line 258 acting upon the spool of the valve 230 does not overcome the spring force generated by the spring 236. Accordingly, the spring 236 maintains the valve 230 within the first open position. The hydraulic force generated by the first pressure line 258 is the product of the hydraulic pressure (P) within the first pressure line 258 and a surface area (A) of the spool that is subjected to the hydraulic pressure (e.g., F=P*A).

The first bypass line 256 and the first pressure line 258 are arranged in parallel to one another and are supplied with pressurized hydraulic fluid from a control branch 260 of the high pressure line 220. The control branch 260 is in fluid communication with the first branch 242 and supplies pressurized hydraulic fluid to each of the valves 226, 228, 230 to execute various control processes within the hydraulic circuit 200. Because the control branch 260 is supplied with pressurized fluid downstream of the pump 202 and directly from the first branch 242, the hydraulic pressure within the control branch 260, the first bypass line 256, and the first pressure line 258 are theoretically equal (e.g., assuming frictional losses are zero). Accordingly, when the pressure and/or flow within the first branch 242 rises, the pressure and/or flow within the control branch 260, the first bypass line 256, and first pressure line 258 rise as well. Because each of the valves 226, 228, 230 block the flow from the control branch 260 in their first open positions, after the control branch 260 is filled with hydraulic fluid from the first branch 242, increases in pump output increase the hydraulic pressure of the hydraulic fluid within the control branch 260.

If the torque calculated by the processor 100 and theoretically experienced by the pump 202 exceeds normal operating conditions (e.g., T>80% maximum torque output), the hydraulic pressure within the first pressure line 258 is likely elevated. The increased hydraulic pressure provides an increase in hydraulic force within the first pressure line 258 that is sufficient to overcome the bias of the spring 236 and move the spool of the valve 230 toward and into the intermediate "closed" position shown in FIG. 5. In the intermediate position, flow through the valve 230 is blocked in every direction, such that no fluid passes entirely through the valve 230.

As the calculated torque continues to rise (e.g., T≥90% maximum torque output) and the pressure within the first pressure line 258 continues to climb, the hydraulic force within the first pressure line 258 pushes the spool of the valve 230 from the intermediate position to the second open position, shown in FIG. 6. The second open position of the valve 230 provides pressure relief to the high pressure line 220 and serves as a safety mechanism to prevent overloading (i.e., over-torqueing) of the pump 202 that could otherwise cause pump stalling and pump failure. Alternatively, the valve 230 can be controlled by the processor 100 to transition to the second open position whenever the processor 100 calculates that the torque (T) experienced by the pump 202 has reached a threshold or maximum acceptable operating condition (e.g., T≥90% maximum torque output).

When the spool of the valve 230 transitions from the intermediate position to the second open position, the valve 230 provides a flow path that places the first bypass line 256 in fluid communication with the first relief line 262 of the control line 222. High pressure hydraulic fluid then passes through the valve 230 into the lower-pressure control line 222, relieving pressure within first bypass line 256. Because the first bypass line 256 is in fluid communication with the first branch 242 of the high pressure line 220, additional highly pressurized hydraulic fluid can be diverted from the first branch 242 into the control branch 260, through the first bypass line 256, into and through the valve 230 to the lower pressure control line 222.

The hydraulic fluid offloaded from the high pressure line 220 into the control line 222 can then be used to override the pump 202. The fluid exiting the valve 230 travels along the first relief line 262 of the control line 222 toward the valve 226. Because the valve 226 is also subjected to hydraulic force from hydraulic fluid passing through the control line 260 (and the hydraulic force acts against the bias of the spring 232), the valve 226 is also in its second open position when an over-torque condition (e.g., T≥90% maximum torque output) is detected by the processor 100 or experienced, generally, within the high pressure line 220. In the second open position, the valve 226 blocks flow from the first relief line 262. Accordingly, once hydraulic fluid has filled the first relief path 262 of the control line 222, additional flow through the first relief line 262 and the valve 230 may be limited (e.g., the pressure within the first relief line 262 approaches the pressure within the first branch 242 of the high pressure line 220).

While the valve 226 blocks flow from the first relief line 262 in the second open position, the valve 226 also provides a flow path connecting a second bypass line 264 of the high pressure line 220 with a second relief line 266 of the control line 222. Highly pressurized hydraulic fluid from the control line 260 and the first branch 242 is directed through the valve 226 and into the lower pressure second relief line 266. Hydraulic fluid within the second relief line 266 flows toward or around the valve 228 within the control line 222. Because the valve 228 is also subjected to hydraulic force from hydraulic fluid passing through the control line 260 (and the hydraulic force acts against the bias of the spring 234), the valve 228 is also in its second open position when an over-torque condition (e.g., T≥90% maximum torque output) is detected by the processor 100.

While fluid flowing toward the valve 228 may be blocked when the valve 228 is in its second open position, the valve 228 similarly creates a flow path connecting a third bypass line 268 of the high pressure line 220 with a third relief line 270 of the control line 222. Highly pressurized hydraulic fluid from the control line 260 and the first branch 242 is directed through the valve 228 and into the lower pressure third relief line 270, where it may join the pressurized hydraulic fluid that was directed from the valve 226 and the second relief line 266 around the valve 228.

The pressurized hydraulic fluid within the control line 222 can then be used to prevent the pump 202 from over-torqueing. Pressurized hydraulic fluid travels from the control line 260 and first branch 242 of the high pressure line into the third relief line 270 of the control line 222 and toward the pump 202. A swashplate positioner 214 is positioned at the end of the third relief line 270 of the control line 222, and is subjected to the hydraulic forces exerted by the hydraulic fluid within the third relief line 270. The swashplate positioner 214 biases the swashplate 208 away from a minimum flow condition (e.g., swashplate angle of 0 degrees) using a spring 216 or other mechanical biasing element, for example. As the pressure within the third relief line 270 builds, the hydraulic force exerted on the swashplate positioner 214 overcomes the bias provided by the spring 216, and begins to move the swashplate positioner 214. Movement of the swashplate positioner 214 moves the swashplate 208 of the pump 202 toward its minimum flow orientation (e.g., swashplate angle of 0 degrees).

By moving the swashplate positioner 214 and changing the angle of the swashplate 208 of the pump 202, the control line 222 effectively overrides the pump 202 to reduce the displacement (e.g., flow rate Q) of the pump 202. Because the torque experienced by the pump's motor is the product of the pump flow rate (Q) and the pressure (P) within the first branch 242 of the high pressure line 220, lowering the displacement (Q) of the pump 202 will lower the amount of torque experienced by the pump's motor. Over-torqueing, slowdown, and stalling conditions are avoided that could otherwise cause irreparable damage to the pump 202.

With the displacement of the pump 202 minimized by the manual positioning of the swashplate 208 performed by the control line 222, pressure within the high pressure line 220 will eventually begin to fall. As the pressure within the high pressure line 220 continues to drop, eventually the biasing forces provided by the springs 232, 234, 236 will be sufficient to overcome the hydraulic forces acting on the valve spools. Accordingly, the valves 226, 228, 230 will return to their first open positions, as shown in FIG. 3. With each valve 226, 228, 230 in its first open position, a continuous fluid flow path extends from the third relief line 270, through the valve 228, through the second relief line 266, through the valve 226, into the first relief line 262, through the valve 230, and finally into the first unloading branch 252 of the drain line 224. Accordingly, when the valves 226, 228, 230 return to their first open positions, the pressurized hydraulic fluid within the control line 222 is effectively flushed from the control line 222, into the drain line 224 and back to the hydraulic fluid reservoir 204.

In some examples, the spring constants of the springs 232, 234, 236 are variable, such that the valves 226, 228, 230 may be subject to transitioning between their first open positions and their second open positions under different operating conditions. For example, the springs 232, 234 controlling the valves 226, 228 may be provided with a higher spring constant so that the valve 230 will transition to its second open position before either of the valves 226, 228 move from their respective first open positions.

If the valve 230 transitions toward the second open position (shown in FIG. 6) while the valves 226, 228 remain in their first open position, hydraulic fluid from first bypass line 256 is supplied through the valve 230 and into the first relief line 262. Because the valves 228, 230 are not one-way valves (e.g., the valves 228, 230 are not check valves), pressurized hydraulic fluid can flow from the first relief line 262 through the valve 226 and into the second relief line 266. With the valve 228 still in the first open position, fluid from the second relief line 266 can pass through the valve 228, into the third relief line 270, and toward the swashplate positioner 214. The hydraulic force exerted on the swashplate positioner 214 will eventually become significant enough to overcome the bias from the spring 216. The swashplate position 214 will translate linearly, rotating the swashplate 208 toward a minimum displacement orientation in order to drop the pump output (Q). Accordingly, the valve 230 can be used alone to provide a torque limiting functionality for the pump 202 that prevents over-torqueing, slowdown, or stalling.

Once the displacement of the pump 202 is minimized by the control line 222 and swashplate positioner 214, the pressure within the high pressure line 220 will once again fall. As the pressure within the first pressure line 258 drops, the force exerted on the spool of the valve 230 falls below the biasing force of the spring 236. The spring 236 then forces the valve 230 to transition from the second open position (FIG. 6) through the intermediate closed position (FIG. 5) and finally back to the first open position (FIG. 4). In the first open position, the first relief line 262 is placed in fluid communication with the first unloading branch 252 of the drain line 224 and the hydraulic fluid reservoir 204. Accordingly, pressurized fluid throughout the control line 222 reverses direction and flows through the valves 226, 228, 230 and relief lines 262, 266, 270 toward the drain line 224 and into the lower pressure hydraulic fluid reservoir 204 to flush the hydraulic circuit 200. With less hydraulic fluid within the control line 222, the swashplate 208 can once again be adjusted to meet displacement requirements inputted or otherwise determined by the processor 100.

Figure 7:
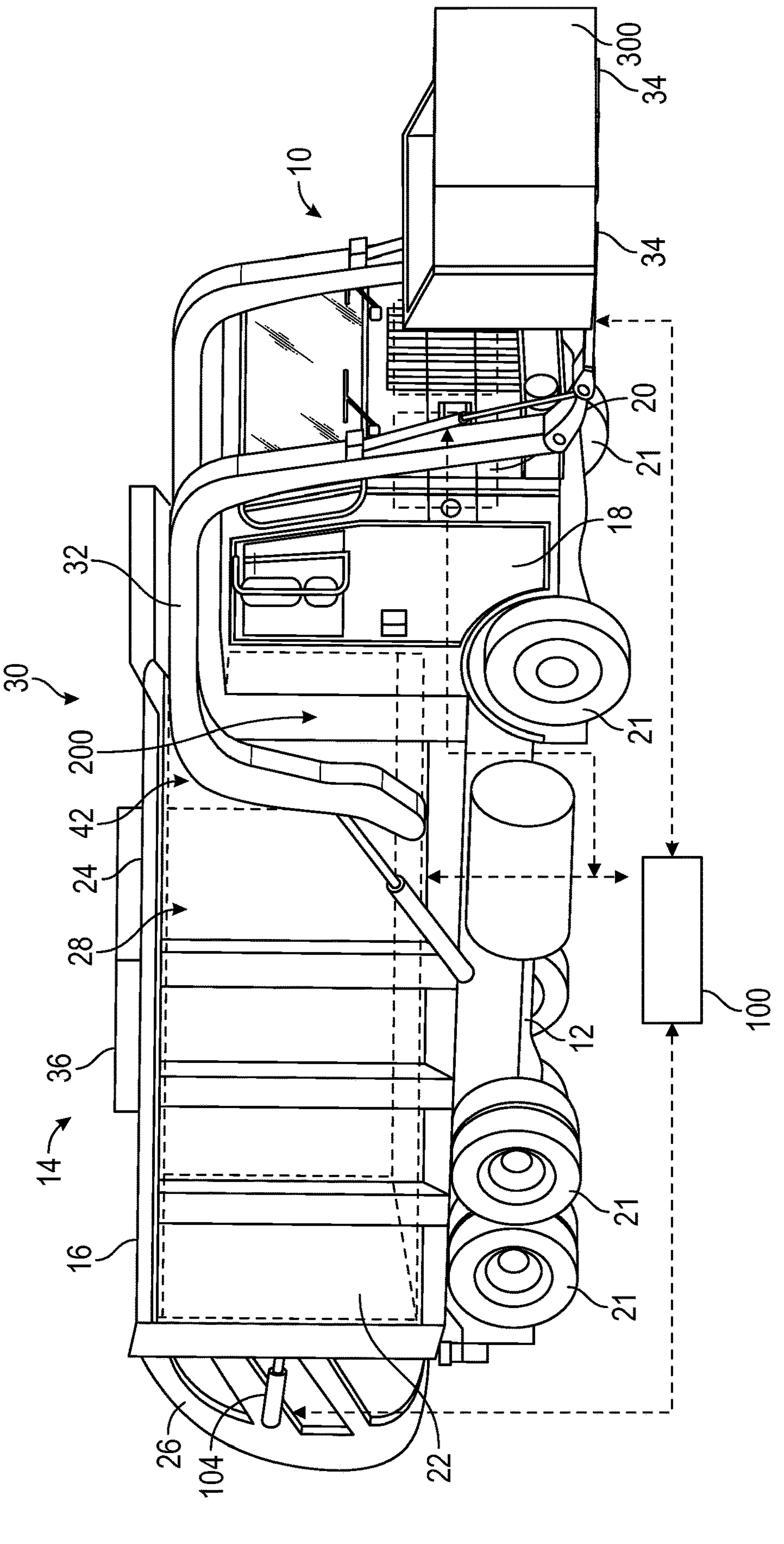
FIG. 7 is a perspective view of the front loading refuse vehicle of FIG. 1 supporting a carry can device, according to an exemplary embodiment.

Although the refuse truck 10 is described in the context of front-end loaders and side loaders, other types of refuse vehicles can incorporate the torque limiting hydraulic circuit 200 disclosed above. For example, rear-end loaders can incorporate the valves 226, 228, 230 and other schematics as well. Additionally, the various loads on the refuse truck 10 can also include external accessories that are hooked into the hydraulic circuit 200. For example, and as depicted in FIG. 7, the pump load 206 can also include a refuse container assembly or "carry can" device 300, The carry can device 300 is configured to selectively couple with the forks 34 of the front loading refuse truck (e.g., the refuse truck 10 shown in FIG. 1), and can impact the pump load 206 in a variety of ways. The weight of the carry can device 300 on the forks 34 and lifting system 30, more generally, may increase the torque experienced by the pump 202, as there will be a greater resistance (e.g., pressure) built up within the high pressure line 220 as the carry can device 300 resists upward movement. In some examples, the carry can device 300 also includes onboard hydraulics that can be coupled with the hydraulic circuit 200. The hydraulics on the carry can device 300 can include a dedicated lifting system and/or a compactor within the unit that can similarly draw hydraulic fluid from the pump 202 to operate. Accordingly, the pump load 206 can represent both the onboard hydraulics of the refuse truck 10, as well as the hydraulics of various accessories that are coupled to the refuse truck 10 and/or being supplied with hydraulic fluid from the pump 202. In some examples, the carry can device 300 can include valving and a dedicated pump that allows the carry can device 300 to continue operating or decouple from the pump load 206 upon detecting an over-torqued condition. In such examples, the carry can device 300 can communicate with the processor 100 to execute a decoupling process from the pump load 206 in the event that elevated pump torque is detected. Additional parameters related to the carry can device 300 are shown and described in commonly-owned U.S. Pat. No. 10,513,392, entitled "Attachment System for Refuse Vehicle," and U.S. Patent Application Publication No. 2020/0346854A1, entitled "Carry Can for Refuse Vehicle," the contents of which are each hereby incorporated by reference in their entireties.

Using the foregoing refuse vehicle control systems and methods, a refuse truck can be controlled to avoid over-torqueing or stalling of the motor during operation. The refuse truck maintains desired pump performance while avoiding potentially irreparable damage to various components within the hydraulic circuit. By mechanically overriding the swashplate of the variable displacement pump to limit piston stroke and flow rate out of the pump, the pump can remain operational without flooding or flushing the entire hydraulic circuit, even when the pump load approaches a maximum allowable limit.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the refuse vehicle as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A refuse vehicle, comprising:

a chassis supporting a plurality of wheels;

a vehicle body supported by the chassis and defining a receptacle for storing refuse therein;

a variable displacement pump positioned within the vehicle body and configured to pump hydraulic fluid from a hydraulic fluid reservoir into a high pressure line of a hydraulic circuit;

a lifting system coupled to the vehicle body and movable relative to the receptacle, the lifting system including at least one actuator in fluid communication with the variable displacement pump, wherein the variable displacement pump delivers pressurized hydraulic fluid from the hydraulic fluid reservoir to the actuator through the high pressure line to adjust a position of the at least one actuator; and a valve positioned downstream of the variable displacement pump and configured to selectively control hydraulic fluid flow between the variable displacement pump and the actuator, wherein in a first position, the valve restricts flow outward from the high pressure line and wherein in a second position, the valve directs hydraulic fluid from the high pressure line into a lower pressure line to reduce a hydraulic pressure within the high pressure line and adjust an output parameter of the variable displacement pump, wherein the valve passes through an intermediate position as the valve transitions from the first position to the second position, wherein in the intermediate position, fluid flow through the valve is blocked.

2. The refuse vehicle of claim 1, wherein the valve is biased into the first position, and wherein the valve transitions from the first position to the second position in response to the hydraulic pressure within the high pressure line exceeding a threshold value.

3. The refuse vehicle of claim 2, wherein the hydraulic pressure within the high pressure line acts against the valve and pushes the valve from the first position to the second position when the hydraulic pressure within the high pressure line exceeds the threshold value.

4. The refuse vehicle of claim 3, wherein the threshold value for hydraulic pressure is at least partially determined by a flow rate from the variable displacement pump.

5. The refuse vehicle of claim 3, wherein the valve is a spool valve.

6. The refuse vehicle of claim 1, wherein the variable displacement pump is a swashplate variable displacement pump, and wherein the hydraulic fluid directed from the high pressure line into the lower pressure line acts against a swashplate of the swashplate variable displacement pump.

7. The refuse vehicle of claim 6, wherein when a hydraulic pressure within the lower pressure line exceeds a second threshold value, the hydraulic fluid within the lower pressure line acts against the swashplate to reduce an angle of the swashplate.

8. The refuse vehicle of claim 7, wherein when the hydraulic pressure within the lower pressure line exceeds a third threshold value, the hydraulic fluid within the lower pressure line reduces the angle of the swashplate to zero degrees to reduce an output of the swashplate variable displacement pump.

9. The refuse vehicle of claim 1, wherein the lifting system supports a carry can device, and wherein the carry can device includes one or more actuators receiving hydraulic fluid from the high pressure line.

10. The refuse vehicle of claim 1, further comprising:

a first sensor positioned along the high pressure line and configured to monitor the hydraulic pressure within the high pressure line;

a second sensor configured to monitor an output flow rate from the variable displacement pump; and a processor in communication with the first sensor and the second sensor, the processor being configured to control the valve to transition between the first position and the second position in response to determining that a product of the hydraulic pressure in the high pressure line and the output flow rate from the variable displacement pump exceeds a threshold value.

11. The refuse vehicle of claim 10, wherein the second sensor is a position sensor mounted to a swashplate of the variable displacement pump and configured to measure an angle of the swashplate, and wherein the processor is configured to determine the output flow rate from the variable displacement pump from the measured angle of the swashplate.

12. The refuse vehicle of claim 10, wherein the valve is a solenoid spool valve configured to move between the first position, and intermediate position, and the second position.

13. A refuse vehicle, comprising:

a chassis supporting a plurality of wheels;

a vehicle body supported by the chassis and defining a receptacle for storing refuse therein;

a variable displacement pump positioned within the vehicle body and configured to pump hydraulic fluid from a hydraulic fluid reservoir into a high pressure line of a hydraulic circuit toward a plurality of actuators positioned about the vehicle body, wherein delivering hydraulic fluid from the hydraulic fluid reservoir to the plurality of actuators through the high pressure line adjusts a position of at least one of the actuators within the plurality of actuators; and a valve positioned downstream of the variable displacement pump and configured to selectively control hydraulic fluid flow between the variable displacement pump and the plurality of actuators, wherein in a first position, the valve restricts flow between the high pressure line and a lower pressure control line and wherein in a second position, the valve directs hydraulic fluid from the high pressure line into the control line to reduce a hydraulic pressure within the high pressure line and adjust an output parameter of the variable displacement pump, wherein the valve is a torque limiting valve biased against a force from the hydraulic pressure within the high pressure line.

14. The refuse vehicle of claim 13, wherein the valve is biased into the first position, and wherein the valve transitions from the first position to the second position in response to the hydraulic pressure within the high pressure line exceeding a threshold value.

15. The refuse vehicle of claim 14, wherein the hydraulic pressure within the high pressure line acts against the valve and pushes the valve from the first position to the second position when the hydraulic pressure within the high pressure line exceeds the threshold value.

16. The refuse vehicle of claim 15, wherein the threshold value for hydraulic pressure is at least partially determined by a flow rate from the variable displacement pump.

17. The refuse vehicle of claim 13, wherein plurality of actuators include at least an actuator on an auxiliary device selectively coupled to the chassis, and wherein the auxiliary device includes a second valve configured to fluidly decouple the auxiliary device from the variable displacement pump in response to receiving an indication that the valve has transitioned out of the first position.

18. The refuse vehicle of claim 13, further comprising a load sensing valve and a compensator valve, wherein each of the load sensing valve and the compensator valve are biased against a force from the hydraulic pressure within the high pressure line.

19. A refuse vehicle, comprising:

a chassis supporting a plurality of wheels;

a vehicle body supported by the chassis and defining a receptacle for storing refuse therein;

a variable displacement pump positioned within the vehicle body and configured to pump hydraulic fluid from a hydraulic fluid reservoir into a high pressure line of a hydraulic circuit toward an actuator positioned about the vehicle body, and wherein delivering hydraulic fluid from the hydraulic fluid reservoir to the actuator through the high pressure line adjusts a position of the actuator, a valve positioned downstream of the variable displacement pump and configured to move between a first open position, a blocking position, and a second open position in response to hydraulic pressure within the high pressure line, wherein when the valve is in the first open position, the valve restricts flow between the high pressure line and a lower pressure control line and wherein when the valve is in the second open position, the valve directs hydraulic fluid from the high pressure line into the control line;

wherein fluid pressure within the control line adjusts a displacement of the variable displacement pump.

20. The refuse vehicle of claim 19, wherein the fluid pressure within the control line adjusts the displacement of the variable displacement pump by reducing an angle of a swashplate on the variable displacement pump to reduce a pump flow rate into the high pressure line.

* * * * *